(12) United States Patent
Kitou et al.

(10) Patent No.: US 7,694,408 B2
(45) Date of Patent: Apr. 13, 2010

(54) METHOD OF MANUFACTURING YOKE OF ELECTRIC ROTARY MACHINE

(75) Inventors: Kazuyuki Kitou, Nagoya (JP); Yasuhiro Hideshima, Anjo (JP); Kiyokazu Futami, Oobu (JP)

(73) Assignee: Denso Corporation, Kariya (JP)

( * ) Notice: Subject to any disclaimer, the term of this patent is extended or adjusted under 35 U.S.C. 154(b) by 897 days.

(21) Appl. No.: 11/363,064

(22) Filed: Feb. 28, 2006

(65) Prior Publication Data
US 2007/0028546 A1 Feb. 8, 2007

(30) Foreign Application Priority Data
Mar. 30, 2005 (JP) .............................. 2005-098329

(51) Int. Cl.
*H02K 15/14* (2006.01)
(52) U.S. Cl. .............................. 29/596; 29/732; 310/89
(58) Field of Classification Search ........... 29/596–598, 29/732–736; 310/89, 154, 260, 266, 268
See application file for complete search history.

(56) References Cited
U.S. PATENT DOCUMENTS

| | | | | |
|---|---|---|---|---|
| 4,309,815 A | * | 1/1982 | Schmitt et al. | 29/596 |
| 5,201,111 A | * | 4/1993 | Prohaska | 310/89 |
| 5,426,337 A | * | 6/1995 | Kobayashi et al. | 310/89 |
| 6,058,594 A | * | 5/2000 | Neumann et al. | 29/596 |
| 6,804,874 B2 | | 10/2004 | Niimi et al. | |
| 7,119,469 B2 | * | 10/2006 | Ortt et al. | 310/154.08 |
| 2005/0028350 A1 | | 2/2005 | Niimi et al. | |

FOREIGN PATENT DOCUMENTS

| | | |
|---|---|---|
| CN | 2403168 Y | 10/2000 |
| JP | A-61-210854 | 9/1986 |
| JP | B2 6-69280 | 9/1986 |
| JP | A-64-060247 | 3/1989 |
| JP | A-2002-095224 | 3/2002 |

OTHER PUBLICATIONS

Notice of Preliminary Rejection for Korean Patent Application No. 10-2006-0028109, issued at the Korean Intellectual Property Office, dated Mar. 12, 2007.
Chinese Office Action issued Nov. 14, 2008.

* cited by examiner

*Primary Examiner*—Minh Trinh
(74) *Attorney, Agent, or Firm*—Oliff & Berridge, PLC

(57) ABSTRACT

A method of manufacturing a yoke of an electric rotary machine is disclosed. The manufacturing method includes providing a cutout steel plate having one end formed with a plurality of concave portions and the other end formed with a plurality of protrusions, rolling the cutout steel plate into a cylindrical shape until a distal end of each protrusion faces the inlet of each concave portion, inserting the protrusions into the concave portions, respectively, in a circumferential direction, and conducting punch-caulking press on each protrusion at near-wall areas on both sides thereof in close proximity to indents of each concave portion to form localized expanding portions at the near-wall areas on both sides of each protrusion while causing the localized expanding portions to flow axially outward to be fitted into the indents of each concave portion, respectively.

3 Claims, 7 Drawing Sheets

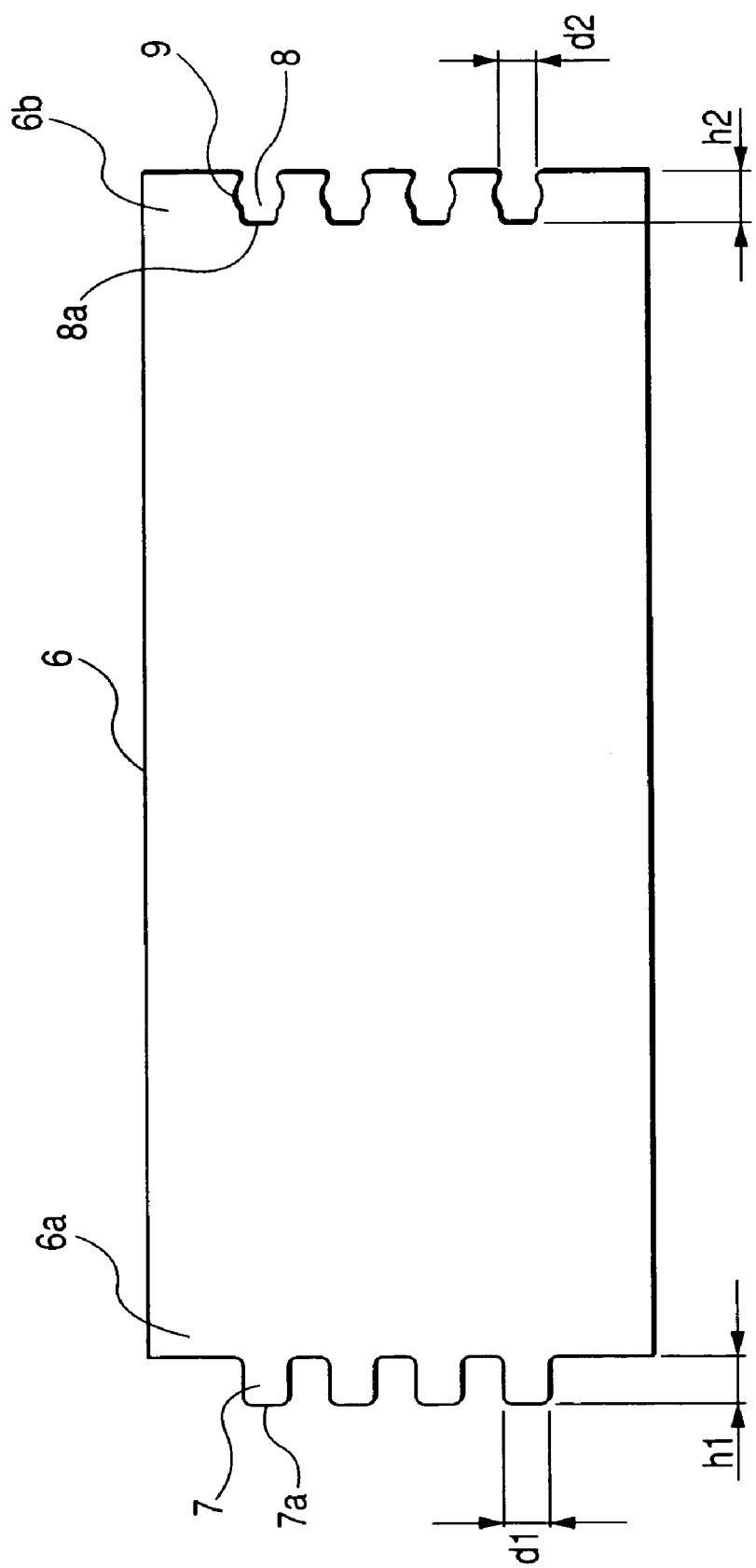

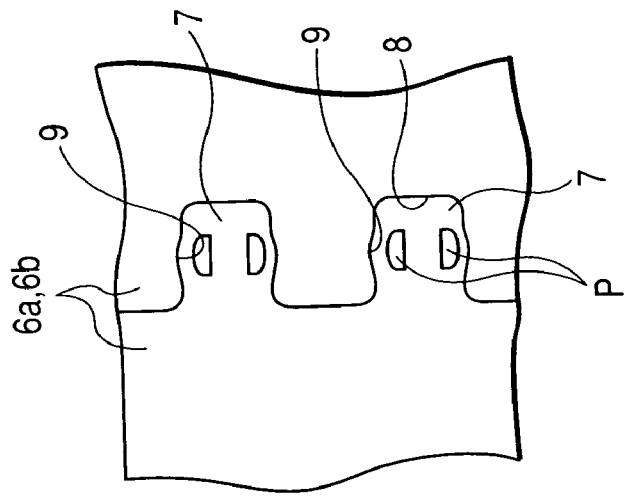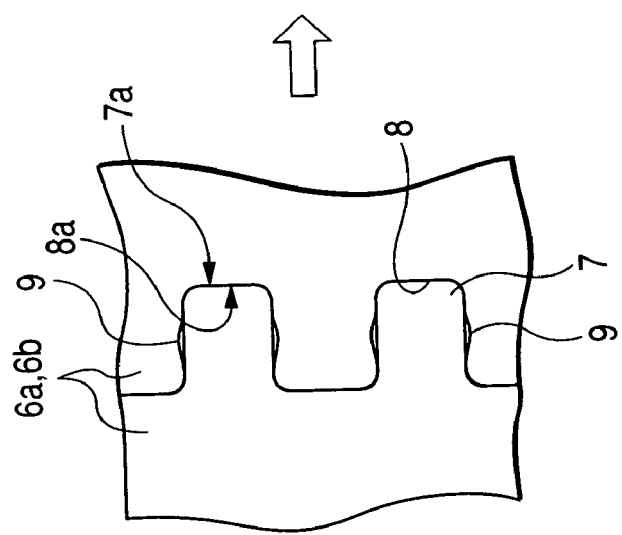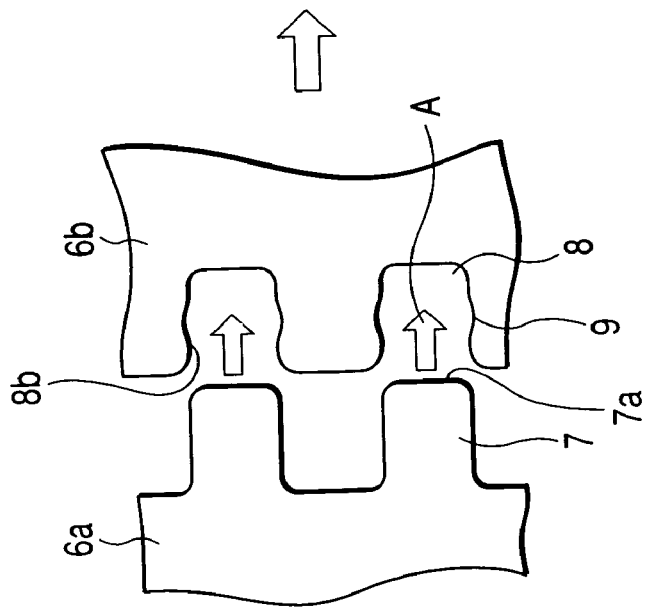

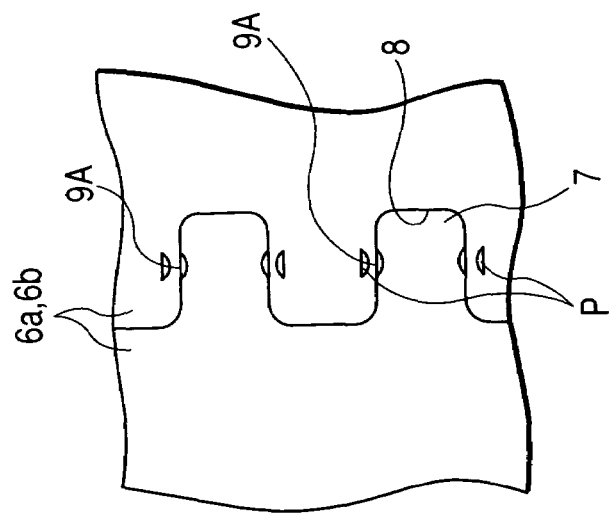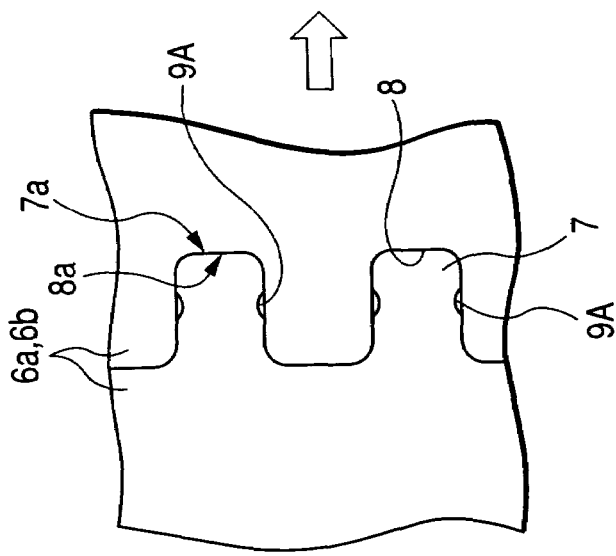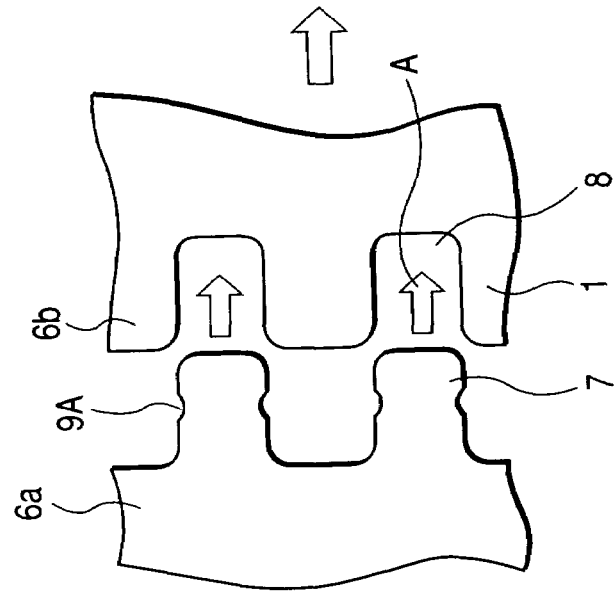

PRIOR ART

METHOD OF MANUFACTURING YOKE OF ELECTRIC ROTARY MACHINE

CROSS REFERENCE TO RELATED APPLICATIONS

This application is related to Japanese Patent Application No. 2005-098329 filed on Mar. 30, 2005, the content of which is hereby incorporated by reference.

BACKGROUND OF THE INVENTION

1. Technical Field of the Invention

The present invention relates to yokes for use in rotary electric machines such as, for instance, starter motors, and, more particularly, to a yoke and a method of manufacturing the yoke.

2. Description of the Related Art

In related art, attempts have heretofore been made to provide a method of manufacturing a yoke for use in a starter motor or the like as disclosed in Japanese Patent Provisional Publication No. 64-60247. In the related art shown in FIG. 6, a steel plate 100, cut out in a rectangular shape, is rolled in a cylindrical configuration. During such rolling, a manufacturing method is carried out by causing protrusions 110, formed on one end of the steel plate 100, to be brought into mating engagement with concave portions 120, formed on the other end of the steel plate 100, after which a central area of each protrusion 110 is press caulked in an expanded portion through which the protrusions 110 and the concave portions 120 are coupled to mechanically joint the both ends 100a, 100b of the steel plate 100.

In such a manufacturing method, when rolling the steel plate 100 in the cylindrical configuration, an inlet of each concave portion 120 is formed in a size equal to or slightly less than a width of each protrusion 110 so as to enable the protrusions 110 and the concave portions 120 to be brought into mating engagement with each other in a circumferential direction as shown by an arrow in FIG. 7A. Further, under a condition where the protrusions 110 and the concave portions 120 remain in mating engagement with each other, a clearance 130 is formed between an outer periphery of each protrusion 110 and an inner periphery of each concave portion 120 as shown in FIG. 7B. Subsequently, as shown in FIG. 7C, a central area of each protrusion 110 is press caulked at PW and a peripheral area of each protrusion 110 is expanded to plug the clearance 130 whereby both ends 100a, 100b of the steel plate 100 are mechanically jointed.

However, the related art method encounters various issues listed below.

a) Under a status where the protrusions 110 remain in mating engagement with the concave portions 120, the clearance 130 is formed substantially around each protrusion 110 and, therefore, it becomes hard for the peripheral area of each protrusion 110 to be uniformly expanded upon punch caulking. This results in increased probability where the clearance 130 is left between each protrusion 110 and each concave portion 120 with the resultant occurrence of issues in airtight capability and reduction in mechanical joint strength between each protrusion 110 and each concave portion 120.

b) If a localized expanding portion, formed by punch caulking, is dislocated toward a distal end of each protrusion 110, that is, when a localized expanding portion increases in greater extent toward the distal end of each protrusion 110, a force is exerted to the yoke to cause the protrusions 110 and the concave portions 120 to be drawn apart from each other, causing deteriorated precision in an inner diameter and roundness of the yoke.

SUMMARY OF THE INVENTION

The present invention has been completed with the above issues in mind and has an object to provide a yoke, which has an increased mechanical joint strength with high precision in an inner diameter and roundness, and a method of manufacturing the yoke.

To achieve the above object, one aspect of the present invention provides a yoke of a rotary electric machine. The yoke comprises a cutout steel plate, formed in a rectangular shape and having one end formed with a plurality of concave portions and the other end formed with a plurality of protrusions, which is rolled in a cylindrical shape under which the protrusions are inserted to the concave portions, respectively, for mechanically jointing both ends of the steel plate. Each of the concave portions has a bottom wall facing a distal end of each of the protrusions and axially spaced sidewalls extending from both ends of the bottom walls. Each of the protrusions has sidewalls with a width substantially equal to or slightly less than an inlet width of each concave portion. The sidewalls of one of each of the concave portions and each of the protrusions have indents that are filled with localized expanding portions formed on the sidewalls of the other one of each concave portion and each protrusion when press work is conducted on the other one of each concave portion and each protrusion.

With such a structure, one of each protrusion and each concave portion has axially spaced sidewalls whose near-wall portions expand in an axial direction of the yoke to fit in the associated indents formed on the other one of each protrusion and each concave portion. Thus, the both ends of the steel plate are jointed to each other with no force applied to both ends of the steel plate causing these two component parts to be drawn apart from each other in a circumferential direction of the yoke. Therefore, conducting punch caulking on one of each protrusion and each concave portion to cause the localized expanding portions to extend in the axial direction of the yoke provides no adverse affect on an inner diameter and roundness of the yoke, providing increased precision in inner diameter and roundness of the yoke.

Further, punch caulking is carried out on one of each protrusion and each concave portion in the axially spaced areas of the sidewalls at positions adjacent to the associated indents formed on the other one of each protrusion and each concave portion, making it able for the near-wall portions to be formed in a uniform manner. This results in the near-wall portions plugging the associated indents with no clearance, enabling the both ends of the steel plate to be jointed in increased mechanical strength.

The sidewalls of each concave portion may preferably have the indents formed in alignment with an axial direction of the yoke at areas facing the sidewalls of each protrusion and the sidewalls of each protrusion have the localized expanding portions that are filled in the associated indents of the sidewalls of each concave portion.

This enables the indents to be formed on the sidewalls of each concave portion during cutout operation of the steel plate, resulting in reduction in additional work to prepare such indents. Also, due to the formation of the indents on the sidewalls of each concave portion in alignment with an axis of the yoke, the localized expanding portions of each protrusion are caused to extend in the axial direction of the yoke. This results in no force acting in a circumferential direction of the yoke. That is, no adverse affect is caused on an inner diameter and roundness of the yoke, which is consequently formed into a cylindrical shape with increased precision in an inner diameter and roundness.

The sidewalls of each protrusion may preferably have the indents formed in alignment with an axial direction of the yoke at areas facing the sidewalls of each concave portion and the sidewalls of each concave portion have the localized expanding portions that are filled in the indents of the sidewalls of each protrusion.

This allows the indents to be formed on the sidewalls of each protrusion during cutout operation of the steel plate, eliminating additional work to prepare such indents. Also, due to the formation of the indents on the sidewalls of each protrusion in alignment with an axis of the yoke, the localized expanding portions of each concave portion can be formed in the axial direction of the yoke. This results in no force acting in a circumferential direction of the yoke. That is, no adverse affect is caused on an inner diameter and roundness of the yoke, which is consequently formed into a cylindrical shape with increased precision in an inner diameter and roundness.

A distal end of each protrusion and a bottom wall of each concave portion may be preferably linearly formed along an axial direction of the yoke and a height of each protrusion and a depth of each concave portion are nearly equal to each other. Under a condition where each protrusion mates with each concave portion, the distal end of each protrusion and the bottom wall of each concave portion are brought into abutting engagement with each other in a circumferential direction of the yoke.

With such a structure, presswork is carried out to caulk the near-wall areas of one of each protrusion and each concave portion under a status where the distal end of each protrusion and the bottom wall of each concave portion are brought into abutting engagement with each other in the circumferential direction of the yoke, causing the localized expanding portions to extend only in the axial direction of the yoke. Thus, no presswork causes a clearance to be formed between the distal end of each protrusion and the bottom wall of each concave portion. This enables an increase in precision of an inner diameter and roundness of the yoke.

Another aspect of the present invention provides a method of manufacturing a yoke of a rotary electric machine wherein a cutout steel plate, formed in a rectangular shape and having one end formed with a plurality of concave portions and the other end formed with a plurality of protrusions, has a cylindrically rolled shape under which the protrusions are inserted to the concave portions, respectively, to mechanically joint the both ends of the steel plate. The method comprises cutting a steel plate to form a cutout steel plate, rolling the cutout steel plate into the cylindrical shape to cause each protrusion to be inserted to each concave portion and, upon rolling step, mechanically jointing each protrusion and each concave portion.

In cutting step, an axial width of each protrusion is formed to be substantially equal to or slightly less than an inlet width of each concave portion and one of each protrusion and each concave portion has sidewalls formed with inwardly concaved indents. In rolling step, the cutout steel plate is rolled to an extent in which a distal end of each protrusion faces an inlet of each concave portion in a circumferential direction after which each protrusion is inserted to each concave portion in the circumferential direction. In jointing step, near-wall areas of the sidewalls of one of each protrusion and each concave portion are press caulked at positions in face-to-face relationship with the associated indents formed on the sidewalls of the other one of each protrusion and each concave portion.

With such a manufacturing method, when rolling the steel plate into the cylindrical shape, no need arises for both ends of the steel plate to be deviated in a radial direction of the yoke and the steel plate can be rolled with the distal end of each protrusion and the inlet of each concave portion being held in face-to-face relationship, that is, under a condition where the distal end of each protrusion and the inlet of each concave portion are aligned on the same radial position. This enables the same amount of spring back displacements to be caused on both ends of each protrusion and each concave portion, thereby eliminating one of factors causing deterioration in an inner diameter and roundness of the yoke.

Further, the near-wall areas of one of each protrusion and each concave portion are press caulked to form localized expanding portions on the sidewalls of one of each protrusion and each concave portion, causing the localized expanding portions to fit the indents, formed on the other one of each protrusion and each concave portion, with no occurrence of clearance. That is, since the localized expanding portions are formed to expand in directions targeting the associated indents, no clearance is created between the distal end of each protrusion and the bottom wall of each concave portion, providing adequate mechanical joint strength between each protrusion and each concave portion.

The sidewalls of each concave portion may be preferably formed with the indents, respectively, at areas facing the sidewalls of each protrusion and the sidewalls of each protrusion have the localized expanding portions that are filled in the indents of the sidewalls of each concave portion.

This causes the indents to be formed on the sidewalls of each concave portion during cutout operation of the steel plate, minimizing additional work to prepare such indents. Also, due to the formation of the indents on the sidewalls of each concave portion in alignment with an axis of the yoke, the localized expanding portions of each protrusion can be formed in the axial direction of the yoke. This results in no force acting in a circumferential direction of the yoke. That is, no adverse affect is caused on an inner diameter and roundness of the yoke, which is consequently formed into a cylindrical shape with increased precision in an inner diameter and roundness.

The sidewalls of each protrusion may be preferably formed with the indents formed in alignment with an axis of the yoke at areas facing the sidewalls of each concave portion and the sidewalls of each concave portion have the localized expanding portions that are filled in the indents of the sidewalls of each protrusion.

This causes the indents to be formed on the sidewalls of each protrusion during cutout operation of the steel plate, minimizing additional work to prepare such indents. Also, due to the formation of the indents on the sidewalls of each protrusion in alignment with the axial direction of the yoke, the localized expanding portions of each concave portion can be formed in the axial direction of the yoke. This results in no force acting in a circumferential direction of the yoke. That is, no adverse affect is caused on an inner diameter and roundness of the yoke, which is consequently formed into a cylindrical shape with increased precision in an inner diameter and roundness.

The jointing may be preferably carried out under a condition where the distal end of each protrusion is circumferentially brought into abutting engagement with the bottom wall of each concave portion and both ends of the cutout steel plate are circumferentially brought into abutting engagement with each other.

Carrying out the jointing through presswork causes the localized expanding portions to extend only in an axial direction of the yoke. Thus, no clearance is created between a distal end of each protrusion and a bottom wall of each concave portion during presswork with no force acting in a direction to draw the both ends of the yoke apart from each other. Thus, no clearance is formed between both ends of the cutout steel plate when executing rolling step. Therefore, the yoke can be manufactured with high precision in an inner diameter and roundness.

The jointing may be preferably performed by punch caulking using a punch that has a shape similar to a shape of each indent.

By using the punch to carry out the caulking step, the localized expanding portions are formed in shapes to similarly conform to shapes of the associated indents. Thus, the localized expanding portions can fit to the associated indents, respectively, resulting in increased mechanical joint strength between each protrusion and each concave portion.

BRIEF DESCRIPTION OF THE DRAWINGS

In the accompanying drawings, in which:

FIG. 2 is a plan view of a cutout steel plate to be formed into the yoke shown in FIG. 1 according to a manufacturing method of the present invention;

FIGS. 3A to 3C are views illustrating a basic sequence of manufacturing steps to form the yoke shown in FIG. 1;

FIGS. 5A to 5C are views illustrating a basic sequence of manufacturing steps for carrying out a manufacturing method of another embodiment according to the present invention;

DETAILED DESCRIPTION OF THE PREFERRED EMBODIMENTS

Best modes for carrying out the present invention are described in detail with reference to embodiments described below.

Example 1

Figure 1:
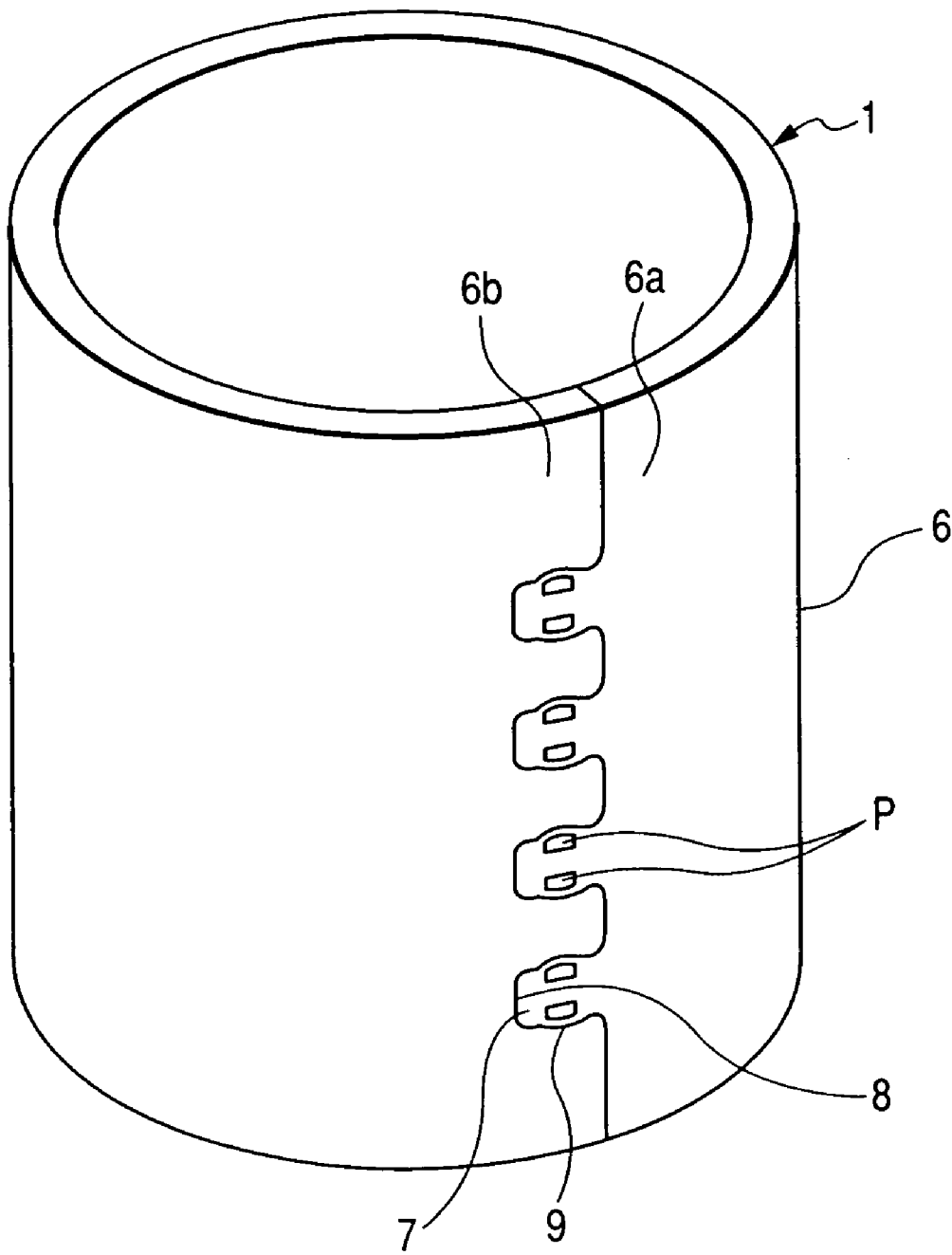
FIG. 1 is a perspective view of a yoke of an embodiment according to the present invention.

FIG. 1 is a perspective view of a yoke 1 and FIG. 2 is a plan view of a cutout steel plate 6 from which the yoke 1 is formed.

Figure 4:
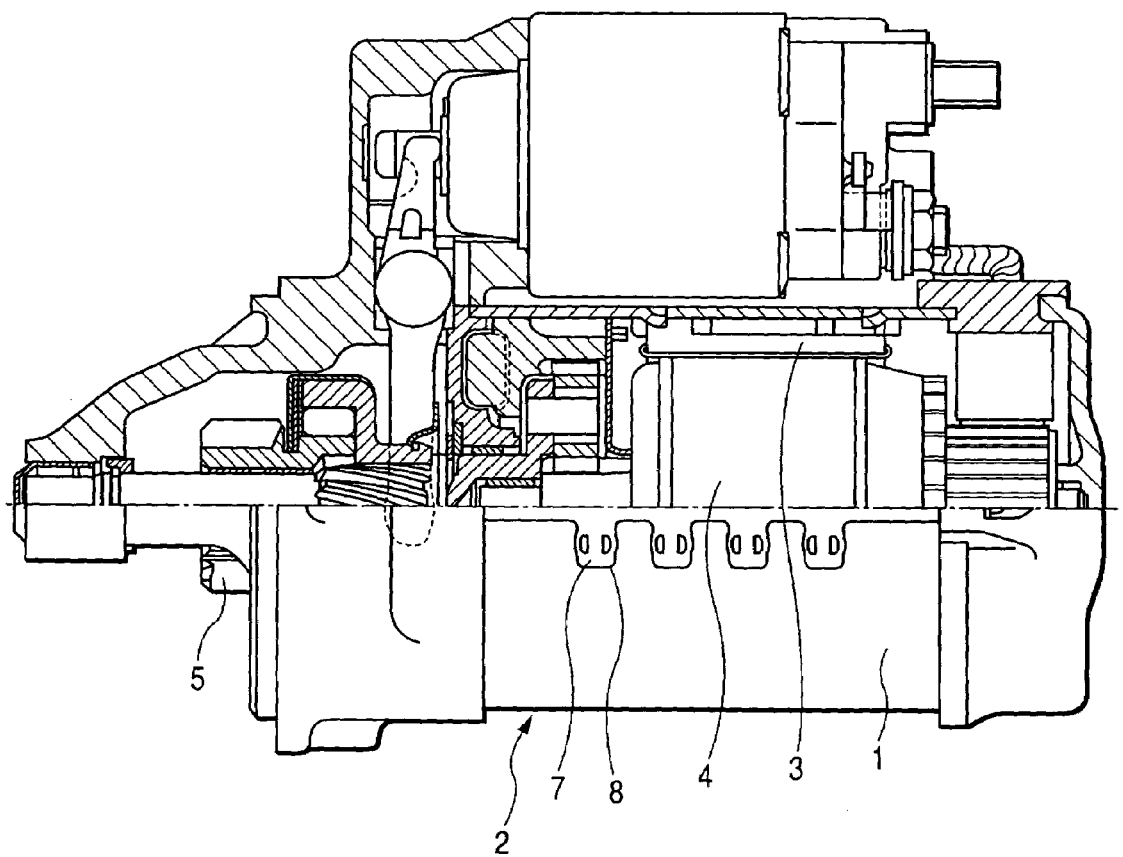
FIG. 4 is a side view of a starter with a half part in cross section incorporating the yoke shown in FIG. 1.
Figure 6:
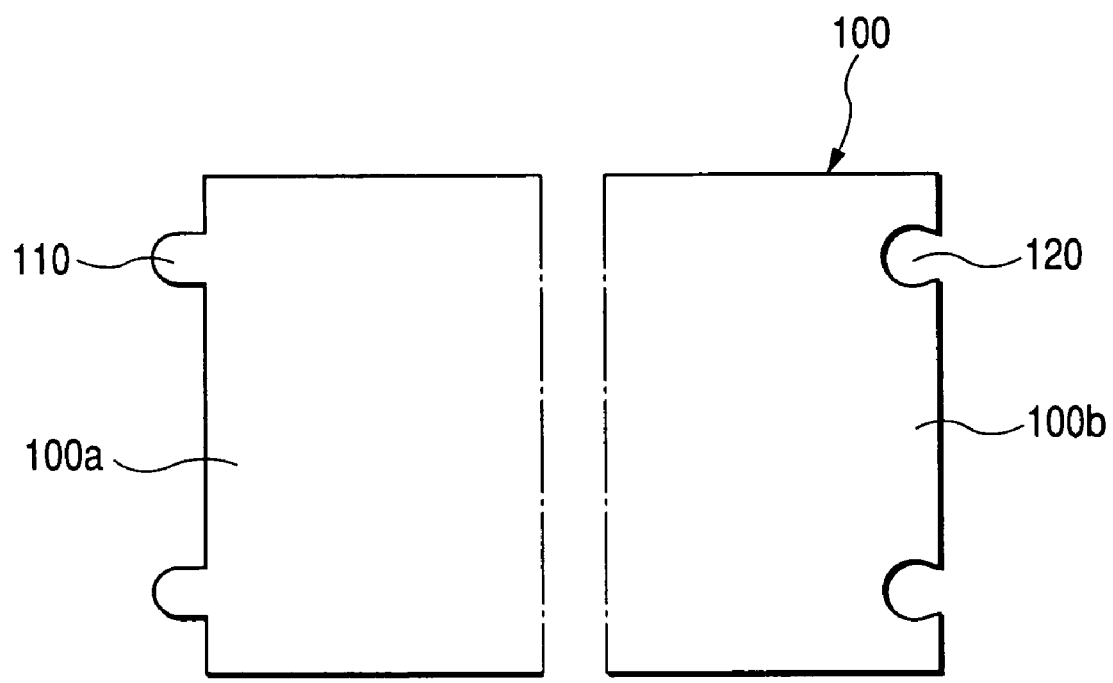
FIG. 6 is a plan view showing a cutout steel plate to be formed in a yoke according to the related art practice.
Figure 7A:
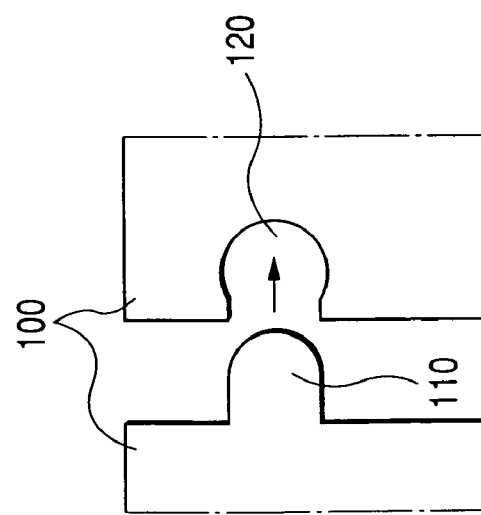
FIGS. 7A to 7C are views illustrating a basic sequence of manufacturing steps of the related art practice.
Figure 7B:
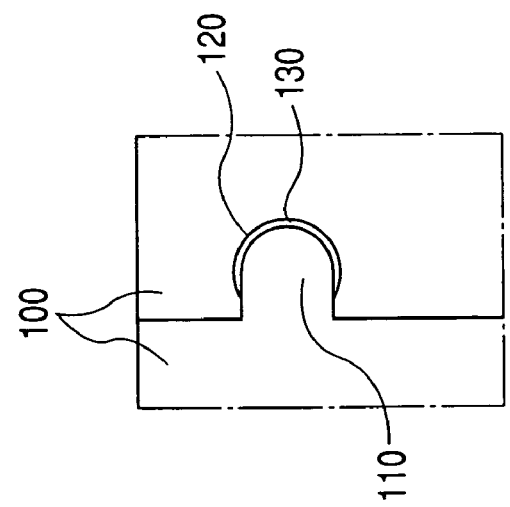
Figure 7C:
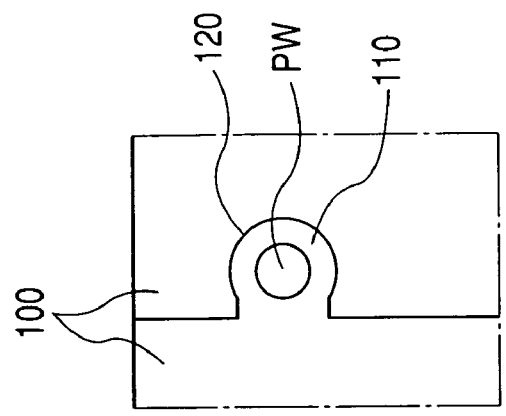

The yoke 1 of a first embodiment may be applied to various devices such as, for instance, a starter motor 2 (representing one example of a rotary electric machine according to the present invention) for startup of an engine as shown in FIG. 4.

As shown in FIG. 4, the starter motor 2 includes a well known direct current motor that is comprised of a magnetic field, composed of a plurality of permanent magnets 3 fixedly mounted on the yoke 1 on an inner periphery thereof to form a magnetic circuit, and an armature 4 rotatably disposed inside the magnetic field. A rotational force, generated on the armature 4, is transferred from a pinion gear 4 to a ring gear (not shown) of an engine. Also, description of a detailed structure and operation of the starter motor 2 is herein omitted.

Turning back to FIG. 1, the yoke 1 is made of a cutout steel plate 6 with a thickness of approximately 2 mm that is rolled into a cylindrical shape, upon which a plurality of axially spaced protrusions 7, preliminarily formed on one end 6a of the cutout steel plate 6, are mechanically brought into mating engagement with a plurality of axially spaced concave portions 8 preliminarily formed on the other end 6b of the cutout steel plate 6 as shown in FIG. 1.

Now, description is made of a method of manufacturing the yoke 1.

The method of manufacturing the yoke 1 is carried out in the following steps:

a) Step of cutting the steel plate 6 in rectangles;

b) Step of rolling the cutout steel plate 6 into a cylindrical shape; and c) Step of mechanically jointing both ends of the steel plate 6 rolled in the cylindrical shape.

In cutting step, a belt-like yoke raw material (steel plate) is cut into pieces each with a given length, preparing a rectangular cutout steel plate 6 as shown in FIG. 2. During such cutting process, the cutout steel plate 6 has one end 6a formed with a plurality of axially spaced protrusions 7 and the other end 6b formed with a plurality of axially spaced concave portions 8.

The protrusions 7 are formed in configurations each of which protrudes from one end 6a of the steel plate 6 in a rectangular shape. The concave portions 8 are concaved in rectangular shapes, respectively, at the other end 6b of the steel plate 6. The same number of protrusions 7 and concave portions 8 are formed in equidistantly spaced areas at identical positions with respect to an axis of the yoke 1. Moreover, both sidewalls of each concave portion 8 has indents 9 formed along the axis of the yoke 1 in face-to-face relationship, respectively, each of which is inwardly indented in a substantially circular arc configuration.

Each concave portion 8 has the same shape as each protrusion 7 in an area except for the indents 9, that is, the shape of each concave portion with both sides extending in linear configurations is identical to a remaining shape from which each protrusion 7 is cut away. In other words, the other end 6b of the cutout steel 6 has a structure formed with a rest portion, resulting from cutting out the protrusions 7, which includes the concave portions 8 whose profiles have the same shapes as those of the protrusions 7, respectively. Accordingly, as shown in FIG. 2, a dimension (a height h1 of the protrusion 7) between an edge of one end 6a of the steel plate 6 and a distal end of the protrusion 7 is substantially equal to a dimension (a depth h2 of the concave portion 8) between an edge of the other end 6b of the steel plate 6 and a bottom wall 8a of the concave portion 8 and the protrusion 7 has a width d1 (a dimension of a short side) of the protrusion 7 is substantially equal to a width d2 (a width with no inclusion of the indents 9) of the concave portion 8.

In the rolling step, the cutout steel plate 6 is rolled into a cylindrical shape such that the protrusions 7 are brought into mating engagement with the associated concave portions 8. During such rolling step, the steel plate 6 is rolled to a position under which a distal end 7a of the protrusion 7 and an inlet 8b of the concave portion 8 face each other in a circumferential direction (as indicated by an arrow A as shown in FIG. 3A) of the steel plate 6 and, subsequently, further rolled so as to cause the protrusions 7 to fit into the concave portions 8 in the circumferential direction. When this takes place, since the height h1 of the protrusion 7 and the depth h2 of the concave portion 8 are substantially equal to each other, the distal end 7a of the protrusion 7 is brought into abutting engagement with the bottom wall 8a of the concave portion 8 with no occurrence of a clearance. Moreover, since the width d2, except for the indents 9, of the concave portion 8 and the width d1 of the protrusion 7 are substantially equal to each other, both of outside areas of the protrusion 7 have clearances, respectively, resulting from the indents 9 formed on the both sides of the concave portion 8 as shown in FIG. 3B.

In jointing step, both of side areas of each protrusion 7 are subjected to press work (hereinafter referred to as punch-caulking press P) using a punch (not shown). This allows localized expanding areas of the protrusion 7 to extend to and fit in the associated indent 9 such that the protrusion 7 and the concave portion 8 are mechanically jointed as shown in FIG. 3C.

Further, during such jointing step, it may be preferable to use a punch whose tip is closely similar to a shape of each indent 9. For instance, in an event that both sides of the concave portion 8 are formed with circular-arc shaped indents 9, it may be possible to employ a punch with an outer peripheral shape curved in a circular arc shape in conformity to the associated indent 9. This allows the localized expanding areas, formed by punch-caulking press P, to fit in the associated indent 9 in more uniform fashion, resulting in improvement in mechanical joint strength between the protrusion 7 and the concave portion 8.

Advantageous Effects of First Embodiment

With the method of manufacturing the yoke 1 set forth above, both ends of the steel plate 6 have no need to be displaced in a radial direction during rolling of the cutout steel plate 6 in a cylindrical shape and the cutout steel plate 6 can be rolled in a manner such that the distal end 7a of the protrusion 7 and the inlet 8b of the concave portion 8 face each other in a circumferential direction, that is, in the same radius. In this case, the amounts of spring-back occurring on the both ends of the steel plate 6 can be made equal to each other, enabling the suppression of a factor causing deteriorated precision in inner diameter dimension and roundness of the yoke 1.

Further, punch-caulking press P is conducted at near-wall areas on both sides of the protrusion 7 in face-to-face relationship with the indents 9 of the concave portion 8. Thus, the protrusion 7 is formed with localized expanding portions, resulting from press work, which flow outward (in an axial direction of the yoke 1) on both sides of the protrusion 7 to fit to the associated indents 9, respectively. With such a method, the protrusion 7 has no need to have an area expanding toward the distal end 7a of the protrusion 7. Therefore, punch-caulking press P can be carried out under a status where the distal end 7a of the protrusion 7 and the bottom wall 8a of the concave portion 8 are brought into abutting engagement with each other with no occurrence of a clearance. Additionally, no probability occurs for a force to act on the protrusion 7 and the concave portion 8 for drawing these component elements apart from each other when conducting punch-caulking press P, causing no occurrence of adverse affects on an inner diametric dimension and roundness of the yoke 1. This makes it able for the yoke 1 to have an inner diametric dimension and roundness maintained with a high precision.

In addition, due to punch-caulking press P conducted at the near-wall areas on both sides of the protrusion 7 at areas in face-to-face relationship with the indents 9, respectively, the near-wall areas of the both sides of the protrusion 7 can be fitted to the associated indents 9 with no occurrence of clearances. That is, the localized expanding portions of the protrusion 7 can be targeted to flow to the associated indents 9. Therefore, no clearance remains between the protrusion 7 and the concave portion 8, enabling the protrusion 7 and the concave portion 8 to be mechanically jointed with a sufficient strength. Moreover, the absence of clearance between the protrusion 7 and the concave portion 8 results in no need for carrying out surface-finishing such as coating or plating or the like to plug the clearance, enabling reduction in manufacturing costs.

Second Embodiment

While the first embodiment has been described with reference to an exemplary structure wherein the concave portion 8 has both sidewalls formed with respective indents 9, the protrusion 7 may have both sides formed with indents 7b as shown in FIGS. 5A to 5C. That is, the both sides of the of the protrusion 7 may be formed with inwardly concaved indents 7b and punch-caulking press P may be carried out at near-wall areas on both sides of the concave portion 8 at areas in face-to-face relationship with the indents 7b as shown in FIG. 5C. In such an alternative, localized expanding portions of the near-wall areas on both sides of the concave portion 8 are caused to flow into the associated indents 7b of the protrusion 7, enabling the same advantageous effects as those of the first embodiment to be obtained.

While the first embodiment has been described with reference to an exemplary structure wherein the permanent magnets 3 are fixedly mounted on the inner periphery of the yoke 1, the yoke 1 of the present invention can also be applied to a magnetic circuit that employs a field coil in place of the permanent magnets 3.

While the specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention, which is to be given the full breadth of the following claims and all equivalents thereof.

What is claimed is:

1. A method of manufacturing a cylindrical yoke of a rotary electric machine wherein a cutout steel plate, having one end formed with a plurality of concave portions and the other end formed with a plurality of protrusions, has a cylindrically rolled shape with the protrusions being inserted into the concave portions, respectively, to mechanically joint the both ends of the steel plate, the method comprising:

providing a cutout steel plate having one end formed with a plurality of concave portions, each of which has a bottom wall and axially spaced sidewalls extending from both ends of the bottom walls and circumferentially extending in substantial parallel to each other, and the other end formed with a plurality of protrusions, each of which has sidewalls extending from the other end of the steel plate and circumferentially extending in substantial parallel to the sidewalls of each concave portion and having a width and a circumferential depth substantially equal to or slightly less than a width and a circumferential depth, respectively, of each concave portion, wherein the sidewalls of each concave portion have indents axially facing with each other to mate with each protrusion;

rolling the cutout steel plate into a cylindrical shape until a distal end of each protrusion faces the inlet of each concave portion;

inserting the protrusions into the concave portions, respectively, in a circumferential direction until the distal end of each protrusion is brought into contact with the bottom wall of each concave portion and both ends of the steel plate are brought into contact with each other; and conducting punch-caulking press on each protrusion at near-wall areas on both sides thereof in close proximity to the indents of each concave portion to form localized expanding portions at the near-wall areas on both sides of each protrusion while causing the localized expanding portions to flow axially outward to be fitted into the indents of each concave portion, respectively, such that the distal end of each protrusion and the bottom wall of each concave portion are brought into abutting engagement with each other with no clearance.

2. The method of manufacturing the cylindrical yoke of the rotary electric machine according to claim 1, wherein:
the conducting is performed by punch caulking using a punch that has a shape similar to a shape of each indent.

3. The method of manufacturing the cylindrical yoke of the rotary electric machine according to claim 1, wherein:
the indents are formed on the near-wall areas of each concave portion along an axis of the yoke.

* * * * *